United States Patent Office 3,692,543
Patented Sept. 19, 1972

3,692,543
FOOD PRODUCTS
Louis A. Powell, Winter Haven, Fla., assignor to
Wellman-Lord, Inc., Lakeland, Fla.
No Drawing. Filed Jan. 28, 1971, Ser. No. 110,636
Int. Cl. A23l 1/24; A23j 3/02
U.S. Cl. 99—144                                 10 Claims

ABSTRACT OF THE DISCLOSURE

Solid, unconstituted free flowing granular food base products having a long storage life and being capable of constitution with water to yield emulsified mayonnaise-like products and containing pregelatinized starch, an emulsifying combination of tricalcium phosphate, dipotassium phosphate and sodium phosphate, and either vegetable oil or synthetic vinegar or both. Additional, ingredients may be added to improve the flavor and texture of the products; including spices, flavorings and sweeteners.

---

The present invention relates to solid, unconstituted food base products which upon mixing with water form a constituted synthetic mayonnaise-like salad dressing. More particularly, the solid, unconstituted food base products of this invention comprise pregelatinized starch, a minor amount of an emulsifying combination of tricalcium phosphate, dipotassium phosphate and sodium phosphate as an egg substitute, and either vegetable oil or acetic acid impregnated on a solid food carrier or both. The starch or starch and oil, when the oil is present, provide at least about 35% or even the major amount of the solid, unconstituted food base products and the acetic acid a minor portion thereof. In any event the starch is at least about 10 weight percent of the food base products, and the starch or starch and vegetable oil is or forms with sugar, if present, a major amount of the unconstituted food base products. The solid food base products of this invention contain sufficient ingestible food solids to provide free-flowing, finely-divided, granular materials which are notable for their heat stability and long storage life. Upon constitution with water the resultant salad dressings are stable under freeze-thaw conditions and retain their emulsified character at elevated temperatures.

Previously salad dressings of the mayonnaise-type have normally contained oil, water, starch, vinegar, eggs, sugar and various other flavorings. These conventional mayonnaise-type dressings are rather unstable, particularly upon the application of heat, and have poor storage characteristics. Therefore, conventional mayonnaise-type salad dressings are unsuitable in the preparation of food products which must be treated by such conventional preserving processes as canning, freezing or sterilization.

A recent U.S. patent to Beach (3,454,405) describes a composition similar to mayonnaise or mayonnaise-type dressings which is said to be stable under sterilization and freeze-thaw conditions. This salad dressing consists essentially of 2 to 15 percent by weight of microcrystalline cellulose, 10 to 35 percent by weight vegetable oil, 0.01 to 11 percent by weight artificial sweetener, 0.1 to 1 percent by weight vegetable gum, 25 to 45 percent by weight water, 7 to 15 percent by weight vinegar, and 0.05 to 1 percent by weight of an emulsifier such as the polyoxyethylene derivative of fatty acid partial esters of hexitol and water.

The compositions of the present invention are characterized by numerous advantages over those of the Beach patent. For instance, the use of food grade acetic acid impregnated in a solid food or ingestible carrier provides a low moisture content synthetic or artificial vinegar and avoids any problem with regard to hydrolysis of starch without having to resort to using microcrystalline cellulose. Also, the solid food base products of this invention have a long storage life and are easily constituted with water prior to use. Moreover, as the water or water and vegetable oil need not be added until the time of use, substantially less storage space for the feed base products is required. The finished, constituted product has outstanding taste, flavor, caloric content and texture, even after freezing and thawing in frozen food products such as sandwiches, salads and sauces.

The pregelatinized starches useful in this invention are available commercially. Pregelatinized starches are pre-cooked with water and thereafter dried, and are thus also characterized by a low moisture content and are solid at room temperature. Advantageously, the drying is by spray drying techniques to effect solubility in cold water. There are numerous sources for these pregelatinized starches such as grain, e.g., corn and sorghum, roots and tubers, e.g., tapioca, arrowroot or potato, or the pith of the stems of certain palms such as sago. Such diverse sources of starch may normally be used according to this invention. Pregelatinized starch from tapioca and corn are, however, preferred due to their propensity to maintain their characteristics upon freezing and thawing and advantageous solubility and taste characteristics.

The low moisture content synthetic or artificial vinegars useful in this invention include commercially available solid products. For instance, a suitable low moisture content artificial vinegar is available from McCormick and Company (Baltimore, Md.). This product is about 8 times stronger, i.e., contains about 8 times the acetic acid content per unit of weight, than 50 grain vinegar, the strength of the normal household variety of vinegar.[1] This product is essentially acetic acid impregnated in an ingestible solid food carrier such as salt, dry fat, sugar or other water-soluble solid. Other ingestible carriers, such as the water-soluble pregelatinized starch components of this invention, might be advantageously used. The term artificial or synthetic "vinegar" is thus a product comprising a low moisture content, food-grade acetic acid-impregnated, ingestible food carrier. The acetic acid content of the "vinegar" should be such that upon constitution with water the product of this invention has an acceptable mayonnaise-like taste and consistency. Normally, the vinegar is present as a minor amount of the constituted food base products. The acetic acid content of the artificial or synthetic vinegar itself is often about 5 to 60, preferably about 10 to 45, percent by weight. Therefore, generally the acetic acid content of the unconstituted food base products is about 0.1 to 5, advantageously about 0.2 to 3, percent by weight of the unconstituted food base products of this invention.

The tricalcium phosphate (calcium orthophosphate), dipotassium phosphate (monohydrogen potassium orthophosphate) and sodium phosphate (sodium orthophosphate) combination is used in the compositions of this invention as an emulsifying substitute for the egg content of normal mayonnaise. A minor amount of the combined phosphates, based upon the total weight of the

---

[1] The strength of vinegar (the concentration of acetic acid) was expressed historically in terms of the grains of sodium bicarbonate neutralized by one fluid ounce of wine measure of vinegar, and in the early vinegar testers this was measured by the volume of carbon dioxide gas evolved from excess of sodium bicarbonate treated with a measured volume of vinegar. The original grain strength multiplied by 0.1565 gave the concentration of acid as acetic acid in grams per 100 cu. cm. Although the term "grain strength" is still commonly used to express the concentration of the acetic acid in a vinegar, one-grain vinegar is defined now as containing 0.1 g. of acetic acid in 100 ml. at 20° C. The present grain strength is thus ten times the acetic acid content. A vinegar meeting the legal minimum of 4 g. acetic acid per 100 cu. cm. would be of 40 grain strength in comparison with the old standard of 25.6 grain strength.

unconstituted solid base products, is sufficient to provide the desired emulsification of the food base upon the addition of water and mixing; each of the phosphates is usually at least about 10 weight percent of their total, preferably at least about 20 percent. The total of these phosphates present is often about 0.6 to 10 weight percent of the unconstituted food base products. The amount of egg substitute combination must be sufficient to provide the desired gel or emulsifying effect but should not be so great as to undesirably affect the taste characteristics of the final product constituted with water and vegetable oil.

Vegetable oil may be present in the unconstituted solid food base product. Vegetable oil must be added to the composition at some time in order to provide an acceptable final mayonnaise-like product. Thus, although an optional ingredient of the base, vegetable oil is present in the solid food base product when ready for use. The vegetable oil content of the product may thus be added with the water by the consumer to form a mayonnaise-like product upon mixing, or alternatively, the vegetable oil content may be added by the manufacturer and the consumer then adds water to prepare a mayonnaise-like product. At least about 9, say about 9 to 85, preferably about 15 to 60 percent, by weight of vegetable oil can be present in the solid unconstituted food products in order to provide a mayonnaise-like product upon the addition of water. As indicated previously this oil can be added by the consumer along with the water or by the manufacturer prior to sale.

Suitable vegetable oils (glyceryl esters of fatty acids) include, for instance, coconut oil, corn oil, cottonseed oil, palm oil, peanut oil, safflower oil, sorghum oil, soybean oil and sunflower seed oil. Normally, the iodine number of the oil is quite immaterial, and, in some instances, highly unsaturated oils are particularly useful. The vegetable oil also provides improved taste to the constituted mayonnaise-like products; however, the caloric content of the final product is thereby increased.

The vegetable oil may advantageously be present as a solid vegetable oil containing composition. Such compositions are solid compositions containing up to about 75% by weight of a vegetable oil supported in a solid ingestible or edible carrier such as sugar or cellulose. An example of such a solid vegetable oil containing composition is "synthetic cream" prepared in a spray-dried system and typically having the following composition:

| Ingredient: | Weight percent |
|---|---|
| Corn syrup solids | 53 |
| Vegetable oil (coconut oil) | 35 |
| Sodium caseinate | 8 |
| Dipotassium phosphate | 1 |
| Tricalcium phosphate | 1.5 |
| Flavor and color | 1.5 |

When "synthetic cream" is present in the solid food base, part or all of the tricalcium phosphate and dipotassium phosphate normally present in the low moisture content food base may be supplied thereby. An additional advantage with using "synthetic cream" is that again most any vegetable oil, for example coconut oil, is useful therein, while the conventional mayonnaise-type products, only high grade vegetable oils having an iodine number of more than 75 are useful.

The ingredients of the solid food base products of this invention are often present in the following approximate amounts, expressed in percent by weight based upon the total unconstituted composition, in order to provide upon constitution with water an emulsified mayonnaise-like product:

| Ingredient | Percent by weight based on the unconstituted product | |
|---|---|---|
| | Useful | Preferred |
| Pre-gelatinized starch | 10-90 | 15-50 |
| Tricalcium phosphate | 0.2-9 | 0.3-5 |
| Dipotassium phosphate | 0.2-8 | 0.3-5 |
| Sodium phosphate | 0.2-8 | 0.3-5 |
| Acetic acid | 0.1-5 | 0.2-3 |
| Vegetable oil | 9-85 | 15-60 |

As previously noted only one of the synthetic vinegar or vegetable oil may be present in the unconstituted product, but even so that amount of a given component is often still in the ranges given in the foregoing table. Preferably both the synthetic vinegar and vegetable oil are in the food base product. Constituted mayonnaise-like products are prepared from the solid food base product of this invention by the addition of water, and thoroughly mixing as with a conventional electric blender, for example. The amount of water added may vary substantially, depending upon the actual amounts of the other various ingredients present. However, preferably about 2 to 3 parts by weight of water is added to 1 part of the solid, unconstituted base food product. Water may, however, be added within the range of about 1 to 5 parts per 1 part of solid, unconstituted food base product.

Additional, optional ingredients may also be present in the solid, unconstituted food base products of this invention to provide an even more desirable final mayonnaise-like product. For instance, the following additional ingredients may be in the solid, unconstituted food base products at the time of constitution with water in the approximate amounts indicated by percent by weight based on the solid, unconstituted food base product:

| Ingredient | Percent by weight based on the unconstituted product | |
|---|---|---|
| | Useful | Preferred |
| Sweeteners or sugars | 0-60 | 5-50 |
| Coloring | 0-2 | 0.5-1 |
| Lemon flavoring | 0-5 | 2-4 |
| Spices | 0-4 | 1-2 |
| Salt | 0-4 | 1-2 |

The sweeteners which may be added may be selected from a wide group of known products. Various refined sugar products such as cane or beet sugar may be used. Also, the sweetener may be provided by the corn syrup solids product in the synthetic cream. If the caloric content of the products is a significant consideration, known artificial sweeteners such as saccharin may be used to reduce the calories.

The coloring used may be pure yellow food color which gives the final, reconstituted mayonnaise product of the invention a rich attractive color. Also, riboflavin is useful for both coloring and improved product quality. Lemon flavoring may be present and can be any of a wide variety of commercial lemon flavorings. This flavoring can be added to complement the vinegar content.

Many spices can be added to the products of this invention, dependent upon the final, reconstituted mayonnaise-type product desired. For a product closely resembling conventional mayonnaise in flavor, a combination of white pepper, marjoram and bay leaf has been found desirable.

Salt is desirably present in a fine-tasting mayonnaise substitute prepared from the low moisture content base product of this invention. It should be noted, however, that salt and the other additional, but optional, ingredients described may be added along with water and vegetable oil by the consumer to the essential ingredients of the low base product of this invention. Also, when present, their amounts are generally a matter of individual taste preference and thus the additional might best be left to the consumer.

The water-constituted mayonnaise-like products of this invention can be used in the manner of conventional mayonnaise as well as additional uses attributed to the advantageous temperature-resistant characteristics of the products. For example, before, upon or after constitution, various ingredients such as catsup, spray dried tomato powder, pickle relish, cheese, sour cream or combinations thereof, etc. might be added thereto to prepare various salad dressings such as a palatable Russian, Thousand-Island or Cheese (Roquefort or Bleu, for example) salad dressing. Additionally, various salads may be prepared from proteinaceous sources such as poultry (chicken or turkey, for example), fish (salmon or tuna, for example), shell fish (shrimp, crab or lobster, for example), vegetables (various combinations including peas, beans or corn, for example) and the like. These salads might then be frozen or refrigerated prior to consumption with acceptable results; this type of product might also be suitably packaged and sold to consumerss. Such products might also be made into frozen sandwiches to be sold in establishments presently dispensing prepared sandwiches.

The following are illustrative examples of both the solid unconstituted food base products and of the water-constituted mayonnaise-like products prepared therefrom of this invention:

EXAMPLE I

A solid unconstituted food base product constitutable with water and the addition of vegetable oil to a product substantially resembling mayonnaise in taste, texture and body is prepared by the admixture of the following ingredients:

| Ingredient: | Amount (grams) |
|---|---|
| Pregelatinized tapioca starch | 42.6 |
| Instant vinegar mix (McCormick & Co.) | 2.0 |
| Tricalcium phosphate | 2.6 |
| Dipotassium phosphate | 1.7 |
| Sodium phosphate | 2.0 |

The following additional ingredients are thereafter added to this initial solid unconstituted food base product to provide a second solid unconstituted food base product.

| Ingredient: | Amount (grams) |
|---|---|
| Vegetable oil | 85.0 |
| Cane sugar | 25.0 |
| Riboflavin (coloring agent) | 0.75 |
| Dry lemon powder | 4.0 |
| Spice of equal parts of white pepper, marjoram and bay leaf | 2.25 |
| Salt | 2.0 |

The addition of one pint of cold water (about 475 grams) to this second composition, followed by thorough mixing with a Hobart mixer for about six minutes, provided a product remarkably like conventional mayonnaise but having a shelf-life substantially longer than conventional mayonnaise.

EXAMPLE II

Another initial solid unconstituted food base product constitutable with water to a mayonnaise-like product is prepared from the following ingredients including "synthetic cream" to supply tricalcium phosphate, dipotassium phosphate and the vegetable oil content:

| Ingredient: | Amount (grams) |
|---|---|
| Synthetic cream (as described above) | 170.4 |
| Pregelatinized tapioca starch | 42.6 |
| Sodium phosphate | 2.0 |
| Instant vinegar mix (McCormick & Co.) | 2.0 |

Thereafter, the following additional ingredients were added to the initial base to provide a second unconstituted food base product:

| Ingredient: | Amount (grams) |
|---|---|
| Cane sugar | 10.0 |
| Dry lemon powder | 4.0 |
| Riboflavin (coloring agent) | 0.75 |
| Spice of equal parts of white pepper, marjoram and bay leaf | 2.25 |

Again, upon constitution with one pint of cold water and thorough mixture with a Hobart blender for about six minutes, a product remarkably like conventional mayonnaise was provided.

EXAMPLE III

Upon constitution of the solid, unconstituted food base product of Example II, 28.4 grams of spray-dried tomato powder (commercially available from Tri-Valley Growers, San Francisco) were also added thereto. A salad dressing closely resembling the type referred to as French or Russian dressing results.

Examples IV through IX indicate additional products similar to that of Example III which may be produced from the unconstituted or constituted, mayonnaise-like products of this invention:

EXAMPLE IV

| | Grams |
|---|---|
| Second dry mayonnaise mix of Example I or II | 140.0 |
| Spray dry tomato powder | 14.2 |
| Granulated sugar | 28.4 |
| Synthetic vinegar | 2.0 |
| Dry relish | 30.0 |
| Tap water or ice water, 1.0 pint. | |

Upon mixing at medium speed until smooth and well blended (about five minutes), a palatable "Thousand-Island" dressing is prepared.

EXAMPLE V

| | Grams |
|---|---|
| Second dry mayonnaise mix of Example I or II | 140.0 |
| Spray dry tomato powder | 14.2 |
| Granulated sugar | 28.4 |
| Synthetic vinegar | 2.0 |
| Dry relish | 30.0 |
| Cold water, 1.0 pint. | |

While whipping at medium speed one chopped hard boiled egg was added. The mixture is then whipped until creamy and smooth to provide a palatable "Russian" dressing. Two ounces of caviar can also be added if desired.

EXAMPLE VI

| | Grams |
|---|---|
| Second dry mayonnaise mix of Example I or II | 140.0 |
| Spray dry tomato powder | 14.2 |
| Granulated sugar | 28.4 |
| Synthetic vinegar | 2.0 |
| Tap water or ice water, 1.0 pint. | |

Upon mixing at medium speed until smooth and well blended (about five minutes), a palatable "French" dressing is prepared.

EXAMPLE VII

| | Grams |
|---|---|
| Second dry mayonnaise mix of Example I or II | 140.0 |
| Synthetic vinegar | 2.0 |
| Dry lemon | 5.0 |
| Dry blue cheese | 28.4 |
| Cold water, 0.75 pint. | |

Upon mixing at medium speed until smooth and well blended (about five minutes), a palatable "Blue Cheese" dressing is prepared.

EXAMPLE VIII

| | Grams |
|---|---|
| Second dry mayonnaise mix of Example I or II | 140.0 |
| Synthetic vinegar | 2.0 |
| Spray dry tomato powder | 10.0 |

Cold water (40°), 0.5 pint.
Scotch whiskey, 2.0 ounces.

Upon mixing with cold water and Scotch whiskey and blending at medium speed until smooth and well blended (about five minutes), a palatable "Fruit Salad" dressing is prepared.

EXAMPLE IX

| | Grams |
|---|---|
| Second dry mayonnaise mix of Example I or II | 140.0 |
| Vinegar | 2.0 |
| Dry lemon | 5.0 |
| Dry relish | 56.8 |

Cold water, ⅜ pint.

Upon mixing at medium speed until smooth and well blended (about five minutes), a palatable tartar sauce is prepared.

It is claimed:

1. A solid, free-flowing, unconstituted food base product having a long storage life, useful for the preparation of a constituted mayonnaise-like product having improved heat stability and storage life, comprising:
   (a) at least about 10% by weight pregelatinized starch,
   (b) an effected emulsifying amount by weight of an egg substitute consisting essentially of a combination of tricalcium phosphate, dipotassium phosphate and sodium phosphate, each of said phosphates being at least about 10 weight percent of their total,
   (c) a member selected from the group consisting of:
      (1) at least about 9% by weight vegetable oil,
      (2) a minor amount of acetic acid impregnated in an ingestible food carrier, and
      (3) a combination of (1) and (2),
   (d) with or without sugar;
   provided that either (a) or (a) plus (c)(1) is at least about 35% by weight of the food base product and either (a) or (a) plus (c)(1) with (d) forms a major amount of the food base product, said amounts being based upon the total weight of ingredients of said solid, free-flowing unconstituted food base product.

2. A product as described in claim 1 wherein about 0.6 to 10% by weight of (b) is present.

3. A product as described in claim 1 wherein the selected member is (c)(1).

4. A product as described in claim 1 wherein the selected member is (c)(2).

5. A product as described in claim 1 wherein the selected member is (c)(3).

6. A product as described in claim 5 wherein about 0.6 to 10% by weight of (b) is present.

7. A product as described in claim 6 wherein about 0.2 to 3% by weight of acetic acid as artificial vinegar is present.

8. An emulsified mayonnaise-like product having improved stability and storage life prepared by constituting the product of claim 5 with water.

9. An emulsified mayonnaise-like product having improved stability and storage life prepared by constituting the product of claim 6 with water.

10. An emulsified mayonnaise-like product having improved stability and storage life prepared by constituting the product of claim 7 with water.

References Cited

UNITED STATES PATENTS

| | | | |
|---|---|---|---|
| 2,217,699 | 10/1940 | Musher | 99—144 |
| 2,629,664 | 2/1953 | Watts | 99—144 X |
| 3,414,413 | 12/1968 | Levin | 99—144 |
| 3,454,405 | 7/1969 | Beach | 99—144 X |

A. LOUIS MONACELL, Primary Examiner

J. M. HUNTER, Assistant Examiner

U.S. Cl. X.R.

99—114